United States Patent
Habibian et al.

(10) Patent No.: US 12,206,869 B2
(45) Date of Patent: Jan. 21, 2025

(54) SKIP CONVOLUTIONS FOR EFFICIENT VIDEO PROCESSING

(71) Applicant: QUALCOMM Incorporated, San Diego, CA (US)

(72) Inventors: Amirhossein Habibian, Amsterdam (NL); Davide Abati, Amsterdam (NL); Babak Ehteshami Bejnordi, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 511 days.

(21) Appl. No.: 17/527,659

(22) Filed: Nov. 16, 2021

(65) Prior Publication Data
US 2022/0159278 A1    May 19, 2022

Related U.S. Application Data

(60) Provisional application No. 63/114,348, filed on Nov. 16, 2020.

(51) Int. Cl.
*H04N 19/19* (2014.01)
*G06N 3/02* (2006.01)
*H04N 19/172* (2014.01)
*H04N 19/184* (2014.01)
*H04N 19/196* (2014.01)

(52) U.S. Cl.
CPC .............. *H04N 19/197* (2014.11); *G06N 3/02* (2013.01); *H04N 19/172* (2014.11); *H04N 19/184* (2014.11)

(58) Field of Classification Search
CPC .................................................... H04N 19/197
USPC ...................................................... 375/240.02
See application file for complete search history.

(56) References Cited

U.S. PATENT DOCUMENTS

| | | | |
|---|---|---|---|
| 6,608,910 B1 * | 8/2003 | Srinivasa | G06V 10/255 382/100 |
| 2011/0051992 A1 * | 3/2011 | Cobb | G06V 20/52 382/100 |
| 2020/0152224 A1 * | 5/2020 | Goldhor | G10L 21/0272 |
| 2021/0223424 A1 * | 7/2021 | Valensi | G01V 1/303 |
| 2022/0051466 A1 * | 2/2022 | Doyle | G06T 1/20 |
| 2022/0400270 A1 * | 12/2022 | Meardi | H04N 19/60 |

OTHER PUBLICATIONS

Cavigelli L., et al., "CBinfer: Change-Based Inference for Convolutional Neural Networks on Video Data", arxiv.org, Cornell University Library, 201 OLIN Library Cornell University Ithaca, NY 14853, Jun. 2017.

(Continued)

*Primary Examiner* — Yulin Sun
(74) *Attorney, Agent, or Firm* — Seyfarth Shaw LLP

(57) ABSTRACT

A method for video processing via an artificial neural network includes receiving a video stream as an input at the artificial neural network. A residual is computed based on a difference between a first feature of a current frame of the video stream and a second feature of a previous frame of the video stream. One or more portions of the current frame of the video stream are processed based on the residual. Additionally, processing is skipped for one or more portions of the current frame of the video based on the residual.

30 Claims, 10 Drawing Sheets

(56) References Cited

OTHER PUBLICATIONS

International Search Report and Written Opinion—PCT/US2021/059581—ISA/EPO—Mar. 7, 2022.
Verelst T., et al., "Dynamic Convolutions: Exploiting Spatial Sparsity for Faster Inference", 2020 IEEE/CVF Conference on Computer Vision and Pattern Recognition (CVPR), IEEE, Jun. 13, 2020 (Jun. 13, 2020), pp. 2317-2326, XP033805414, DOI: 10.1109/CVPR42600.2020.00239 [Retrieved on Aug. 3, 2020].
Ying W., et al., "An Edge 3D CNN Accelerator for Low-Power Activity Recognition", IEEE Transactions on Computer-Aided Design of Integrated Circuits and Systems, IEEE, USA, vol. 40, No. 5, May 21, 2021, pp. 918-930, [Retrieved on Apr. 20, 2021].

\* cited by examiner

SKIP CONVOLUTIONS FOR EFFICIENT VIDEO PROCESSING

CROSS-REFERENCE TO RELATED APPLICATION

The present application claims the benefit of U.S. Provisional Patent Application No. 63/114,348, filed on Nov. 16, 2020, and titled "SKIP CONVOLUTIONS FOR EFFICIENT VIDEO PROCESSING," the disclosure of which is expressly incorporated by reference in its entirety.

FIELD OF DISCLOSURE

Aspects of the present disclosure generally relate to energy efficient video processing via an artificial neural networks.

BACKGROUND

Artificial neural networks may comprise interconnected groups of artificial neurons (e.g., neuron models). The artificial neural network may be a computational device or represented as a method to be performed by a computational device.

Neural networks consist of operands that consume tensors and produce tensors. Neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, pattern recognition, speech recognition, autonomous driving, and other classification tasks.

Neural networks also have numerous applications in image-based processing of videos or video streams such as human pose estimation, object detection, semantic segmentation, as well as video compression and denoising. Unfortunately, such video processing is computationally intensive which results in significant time and energy consumption.

SUMMARY

The present disclosure is set forth in the independent claims, respectively. Some aspects of the invention are described in the dependent claims.

In an aspect of the present disclosure, a method for video processing with an artificial neural network (ANN) is provided. The method includes receiving a video stream as an input at the artificial neural network. The method also includes computing a residual based on a difference between a first feature of a current frame of the video stream and a second feature of a previous frame of the video stream. Additionally, the method includes processing one or more portions of the current frame of the video stream based on the residual.

In another aspect of the present disclosure, an apparatus for video processing with an artificial neural network (ANN) is provided. The apparatus includes a memory and one or more processors coupled to the memory. The processor(s) are configured to receive a video stream as an input at the artificial neural network. The processor(s) are also configured to compute a residual based on a difference between a first feature of a current frame of the video stream and a second feature of a previous frame of the video stream. In addition, the processor(s) are configured to process one or more portions of the current frame of the video stream based on the residual.

In an aspect of the present disclosure, an apparatus for video processing with an artificial neural network (ANN) is provided. The apparatus includes means for receiving a video stream as an input at the artificial neural network. The apparatus also includes means for computing a residual based on a difference between a first feature of a current frame of the video stream and a second feature of a previous frame of the video stream. Additionally, the apparatus includes means for processing one or more portions of the current frame of the video stream based on the residual.

In a further aspect of the present disclosure, a non-transitory computer readable medium is provided. The computer readable medium has encoded thereon program code for video processing with an artificial neural network (ANN). The program code is executed by a processor and includes code to receive a video stream as an input at the artificial neural network. The program code also includes code to compute a residual based on a difference between a first feature of a current frame of the video stream and a second feature of a previous frame of the video stream. Furthermore, the program code includes code to process one or more portions of the current frame of the video stream based on the residual.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
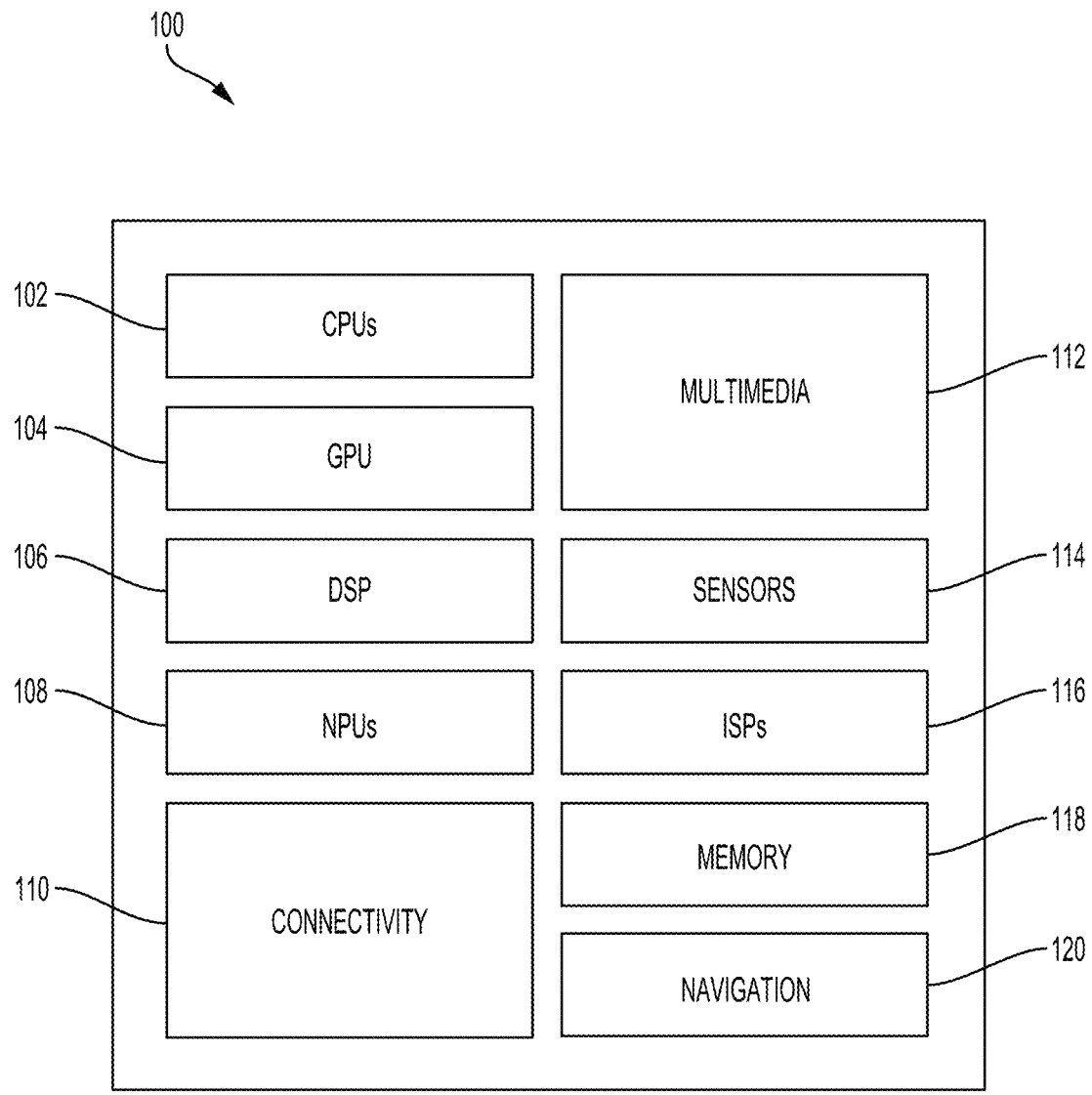
FIG. 1 illustrates an example implementation of a neural network using a system-on-a-chip (SoC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Neural networks have numerous applications in image-based processing of videos or video streams such as human pose estimation, object detection, semantic segmentation, as well as video compression and de-noising. Unfortunately, such video processing is computationally intensive which results in significant time and energy consumption.

Videos may have substantial similarity from one frame to the next. Because of such similarities, there may be a large amount of redundancy in the computations that are performed for consecutive frames. This may be particularly so when a neural network performs the video processing, because such networks may perform convolution operations for each pixel in each video frame. Aspects of the present disclosure are directed to skip convolutions to leverage the large amount of redundancies in video streams, in order to reduce computations and conserve energy. Skip convolutions adaptively adjust the computing with respect to the amount of information observed per frame. That is, convolutional kernels may be applied to salient regions of a video frame while skipping the regions that are substantially similar in consecutive frames. The saliency maps may be obtained based on the magnitude of changes between frames or by learning a gating function efficiently integrated into each convolution layer. In some aspects, skip convolution can incorporate various structures (e.g., a block-wise implementation) for efficient implementation of hardware platforms. Skip convolutions may also be incorporated in any image processing network to optimize the inference cost in stream settings.

FIG. 1 illustrates an example implementation of a system-on-a-chip (SoC) 100, which may include a central processing unit (CPU) 102 or a multi-core CPU configured for processing a video with an artificial neural network (e.g., a neural end-to-end network). Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SoC 100 may also include a sensor processor 114, image signal processors (ISPs) 116, and/or navigation module 120, which may include a global positioning system.

The SoC 100 may be based on an ARM instruction set. In an aspect of the present disclosure, the instructions loaded into the general-purpose processor 102 may include code to receive a video stream as an input at the artificial neural network. The general-purpose processor 102 may also include code to compute a residual based on a difference between a first feature of a current frame of the video stream and a second feature of a previous frame of the video stream. The general-purpose processor 102 may further include code to process of one or more portions of the current frame of the video stream based at least in part on the residual.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
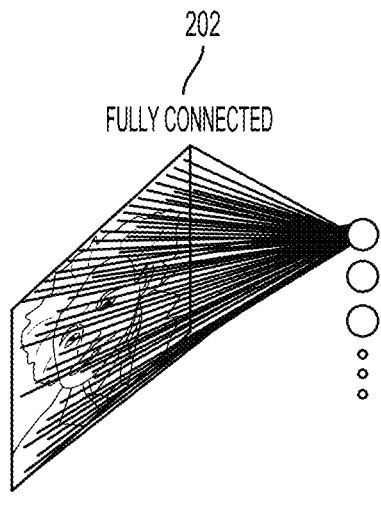
FIGS. 2A, 2B, and 2C are diagrams illustrating a neural network, in accordance with aspects of the present disclosure.
Figure 2B:
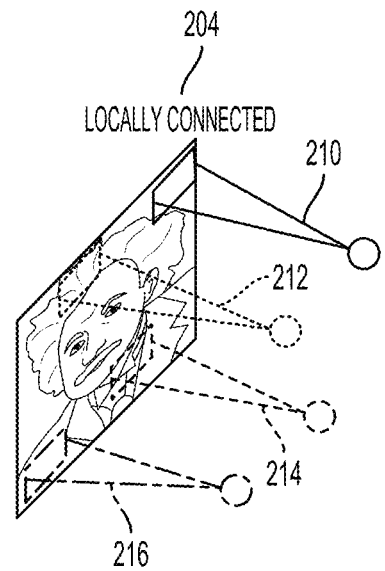

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
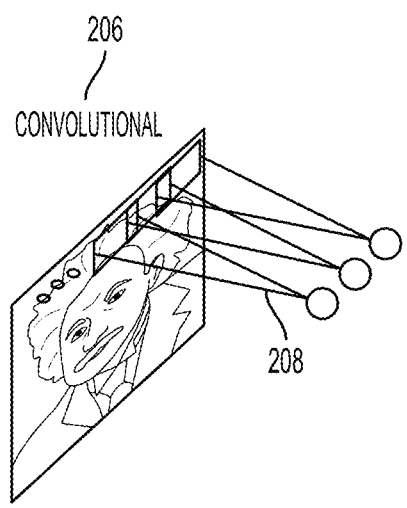

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
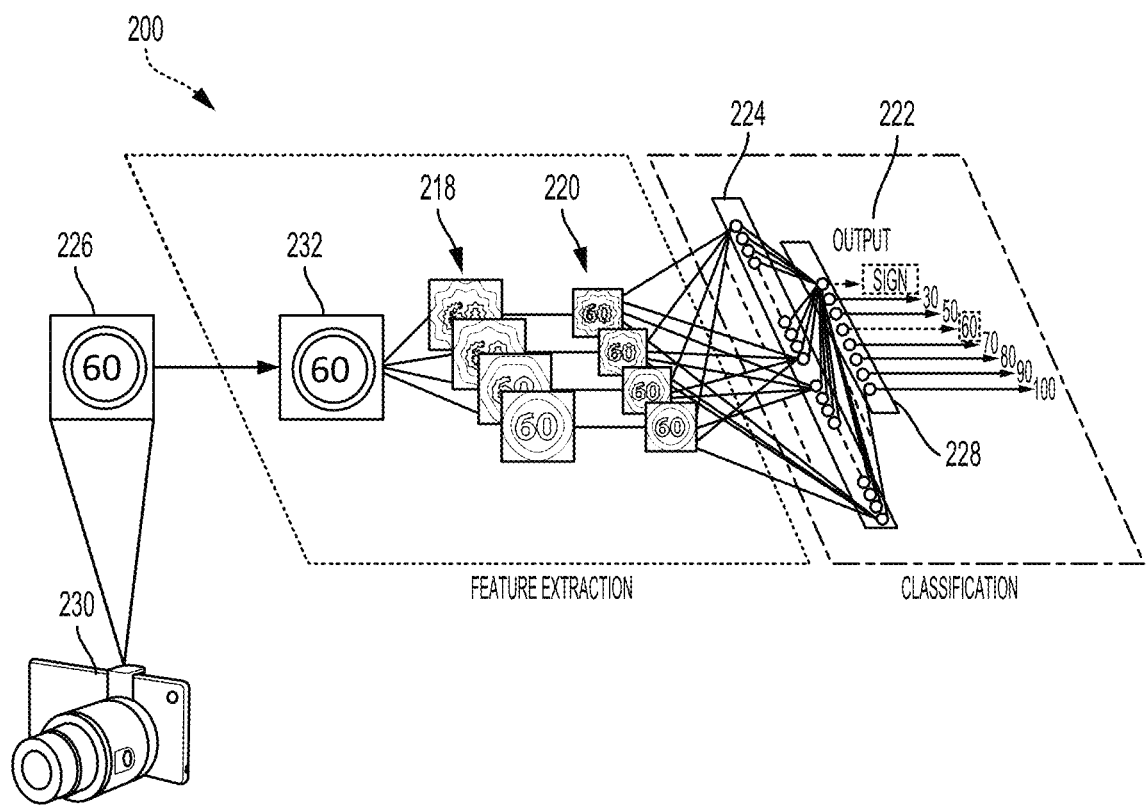
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
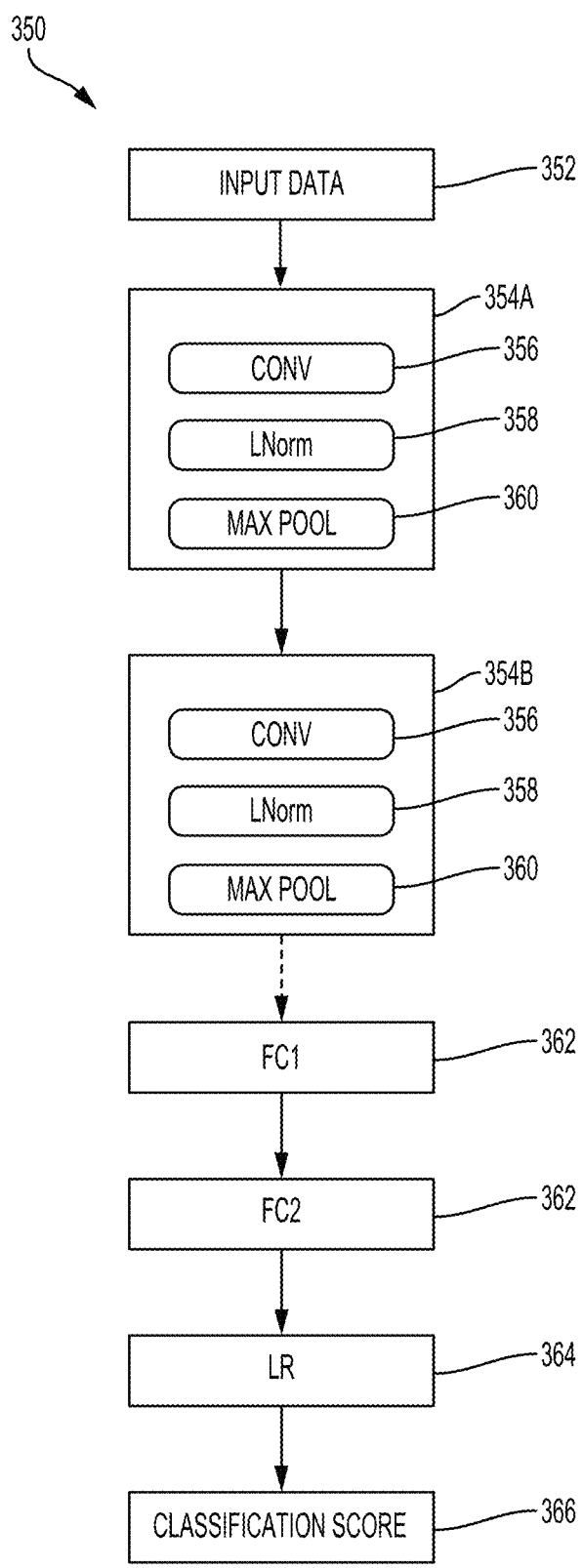
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SoC 100 to achieve high performance and low power consumption. In alternative embodiments, the parallel filter banks may be loaded on the DSP 106 or an ISP 116 of an SoC 100. In addition, the deep convolutional network 350 may access other processing blocks that may be present on the SoC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
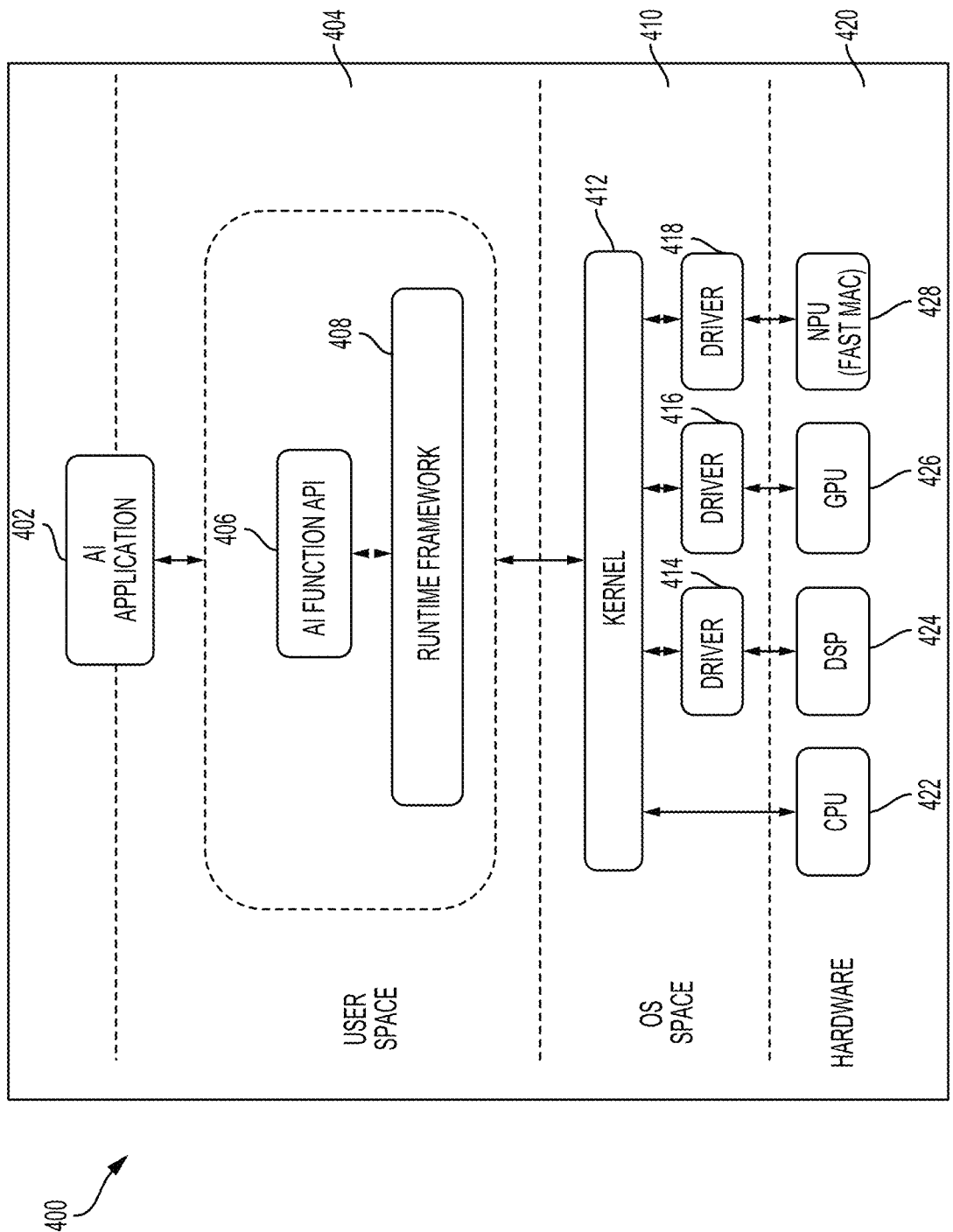
FIG. 4 is a block diagram illustrating an exemplary software architecture that may modularize artificial intelligence (AI) functions.

FIG. 4 is a block diagram illustrating an exemplary software architecture 400 that may modularize artificial intelligence (AI) functions. Using the architecture, applications may be designed that may cause various processing blocks of a system-on-a-chip (SoC) 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space, such as a Linux Kernel 412, running on the SoC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SoC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

As described, artificial neural networks (ANN) are useful for processing videos. However, videos may have large amounts of redundancy across video frames. As such, ANN-based video processing systems may perform the same convolution operation multiple times. Such processing is time consuming and results in significant energy consumption. Accordingly, aspects of the present disclosure are directed to avoiding processing or skipping performance of convolution operations of redundant portions of consecutive video frames. The skip convolution may be applied to video processing systems including convolutional neural networks. The neural network may learn to skip the processing of residual frames or a portion of frames within the video stream.

Rather than considering a video to be a sequence of still images, the video may be represented as a series of residual frames defined both for the input frames and for intermediate feature maps. A gating function may be employed to determine whether to process or skip each location in residual frames.

For example, a convolutional neural network (CNN) may be configured with L layers. At a given layer l, a kernel $w \in \mathbb{R}^{c_o \times c_i \times k_h \times k_w}$ is applied to a sequence of feature maps $\{x_t\}_{t=1}^T$, $x_t \in \mathbb{R}^{c_i \times h \times w}$ to produce a sequence of feature maps $\{z_t\}_{t=1}^T$, $z_t \in \mathbb{R}^{c_o \times h \times w}$, independently across time-steps, for each frame, such that:

$$z_t = w * x_t \qquad (1)$$

where h and w are the height and width of the input feature map, $c_o$ is the output channel, $c_i$ is the input channel, and $k_h$, $k_w$ are the height and width of the kernel w.

As the convolution is a linear function, the output sequence may be obtained by convolving the kernel w and a difference between two consecutive feature maps:

$$z_t = z_{t-1} + w * (x_t - x_{t-1}) = z_{t-1} + w * r_t, \qquad (2)$$

where $r_t$ represents the residual frame as a temporal difference between the current feature map and the previous feature map, expressed as $x_t - x_{t-1}$. Although the decomposition in Equation 2 describes a single time step, it can, of course, be generalized to longer sequences. Because consecutive or sequential frames in a video may be highly correlated, the residual frame $r_t$ may be very sparse, and carry a non-zero difference signal in fewer, and in some aspects, very few spatial locations. For every kernel support (e.g., pattern of zero elements) filled with zero values in $r_t$, the corresponding output will also be zero. As such, a convolution operation for the subsequent feature maps may be skipped. For example, the convolution operation for the subsequent feature map $x_t$ may be avoided or skipped by copying values from a previous convolution $z_{t-1}$ to the value of the current convolution $z_t$.

Figure 5:
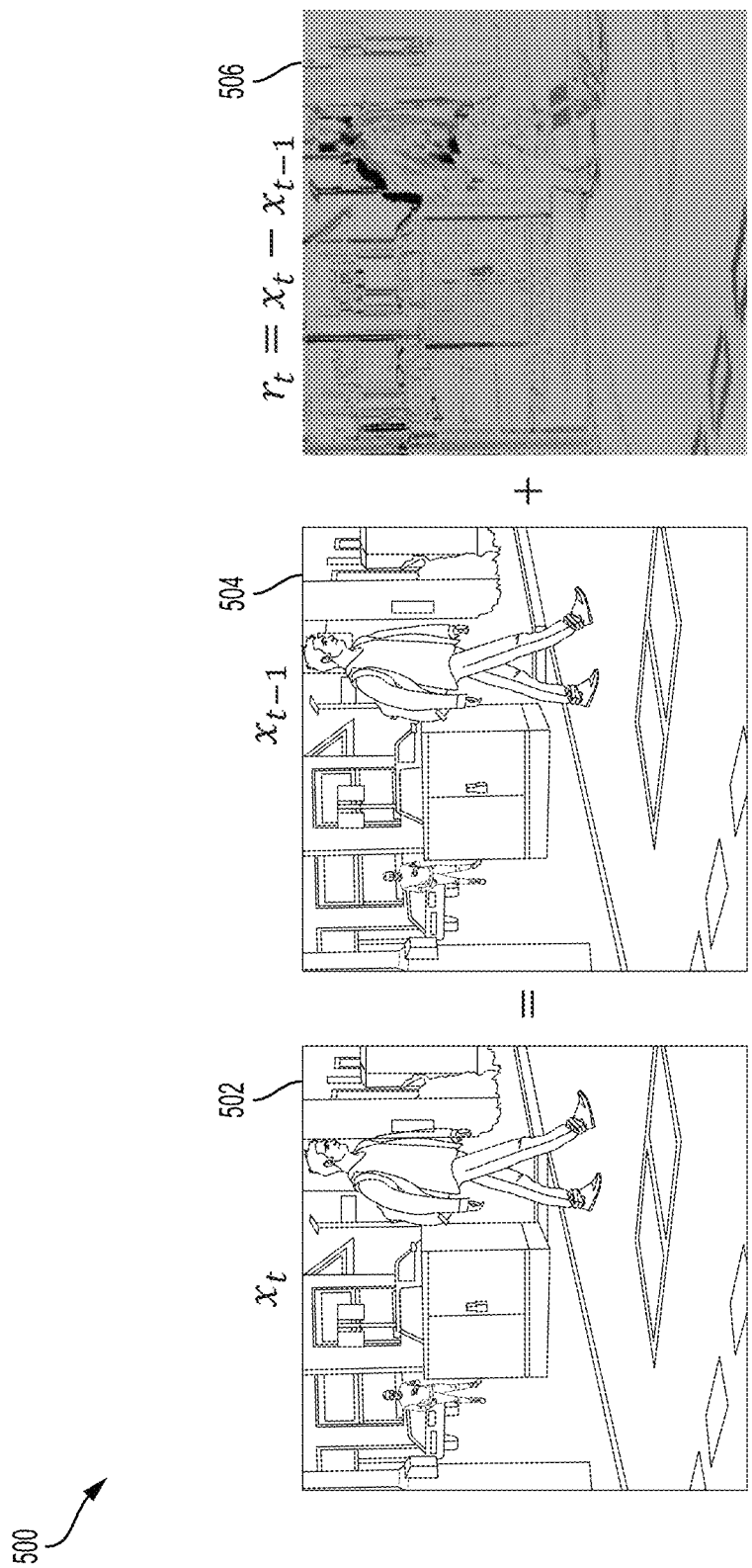
FIG. 5 is a diagram illustrating an example residual determination, in accordance with aspects of the present disclosure.

FIG. 5 is a diagram illustrating an example residual determination 500, in accordance with aspects of the present disclosure. Referring to FIG. 5, a video sequence including frames (e.g., frames with sequential timings) 502 and 504 is shown. Frame 502 provides an image of a boy walking at a time t. Frame 504 provides an image of a boy walking at a previous time t−1. While the pose or position of the boy appears to change from frame 502 and frame 504, much of the image in frame 502 (e.g., the background) appears to be the same or very similar to the image of frame 504. Each of the frames 502, 504 may be supplied in a sequence of inputs of a video stream. To improve processing (e.g., object detection or human pose estimation), a residual or difference between the frames 502, 504 may be computed. The residual frame may put a strong prior on the informative regions to be processed versus non-informative regions that may be skipped. As shown in FIG. 5, a residual frame 506 may be determined by computing the difference between the input features for frame 502 $x_t$ and frame 504 $x_{t-1}$. A video processing system, including a CNN (e.g., deep convolutional network 350), may be configured to skip processing of residual portions or portions of the frame 502 that are determined to be the same as the previous frame 504. That is, based on the residual $r_t$, convolution operations for one or more regions or portions of frame 502 may be avoided. Instead, the result of the convolution operation $z_t$ for such regions of frame 502 may be equal to the result of the convolutions operations $z_{t-1}$ performed for a corresponding region of frame 504. Thus, convolutions for processing frame 504 may be limited to regions with non-zero $r_t$.

In some aspects, residuals that are sparse may still include many locations with small non-zero values that may be sufficient to prevent skipping processing for such locations. To further improve processing efficiency, a gating function may be included at each convolutional layer, for example, to impose skipping of residual frames. The gating function may be defined as g: $\mathbb{R}^{c \times h \times w} \to \{0,1\}^{h \times w}$. The gating function may predict a binary mask indicating locations that may be processed and which may be skipped as based on the input residual $r_t$, and in some aspects, based only on the input residual $r_t$. As such, the gating function g may generate, based on the input residual $r_t$, a binary decision for each output pixel. With this binary decision, the gating function output determines whether the convolution operation is to be performed or skipped for specific pixel locations of a video frame. Accordingly, the convolution output may be adapted as:

$$\tilde{z}_t = \tilde{z}_{t-1} + g(r_t) \odot (w * r_t) \quad (3)$$

where $\odot$ indicates a broadcasted Hadamard product and the ~ symbol indicates that $\tilde{z}_t$ is an approximation of $z_t$. The Hadamard product is a binary operation that takes two matrices of the same dimensions and produces another matrix of the same dimension as the operands, where each element i,j is the product of elements i,j of the original two matrices. Thus, Equation 3 characterizes a skip convolution model, where a convolution operation is performed only for the previous frame of the sequence, and a gating function g controls whether to perform convolution operations for one or more portions of a kernel w for a current frame, based on the residual $r_t$.

Figure 6:
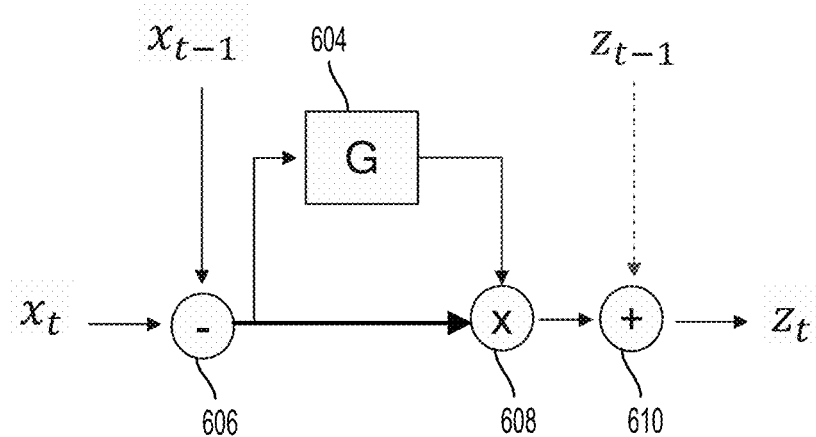
FIG. 6 is a block diagram illustrating an example skip convolution layer, in accordance with aspects of the present disclosure.

FIG. 6 is a block diagram illustrating an example skip convolution layer 600, in accordance with aspects of the present disclosure. Referring to FIG. 6, the skip convolution layer 600 includes a gating function 604. The gating function 604 may enforce the sparsity of the residual. The gating function 604 may receive the residual as input and may predict a binary variable (e.g., 0 or 1) to sparsify the residual. That is, the gating function learns to zero out or mask negligible residuals (e.g., residuals where the input does not change the output (e.g., a prediction)).

As shown in FIG. 6, the skip convolution layer 600 receives as inputs a feature $x_t$ corresponding to a previous frame and a feature corresponding to a previous frame $x_{t-1}$. The difference between the feature $x_t$ and the previous feature $x_{t-1}$ is computed at a difference node 606 to determine a residual $r_t$. The residual $r_t$ is supplied to the gating block 604. The gating block 604 applies a gating function to determine whether to process or mask out each portion of the frame corresponding to the feature. For example, where the residual $r_t$ for a portion of the feature $x_t$ is negligible (e.g., <0.5), the gating block 604 may output a zero to a convolution node 608 to skip the convolution operation with a weight w supplied via the convolution block 602. As such, the convolution node 608 outputs a zero to a summing node 610, which also receives the prior computed output $z_{t-1}$. Thus, the summing node 610 outputs $z_t$ as equal to the value of the previous output $z_{t-1}$.

On the other hand, where the residual is not negligible (e.g., >0.5), the summing node 610 outputs $z_t$ as equal to the sum of a convolution operation for the corresponding portion of the feature $x_t$ and the previous output $z_{t-1}$ to produce output $z_t$.

In some aspects, the skip convolution layer 600 may replace a convolution layer of a CNN. For example, the skip convolution layer 600 may be used in place of one or more convolution layers 356 of the deep convolutional network 350, shown in FIG. 3.

In some aspects, the gating function g may be configured post-training (e.g., without training) or the gating function may be learned. For post-training gates, the gating function may determine whether to skip a residual based on its magnitude. For instance, the gating function may skip a residual based on a scalar threshold E. Such gates may be referred to as Norm gates. In one example, the gating decision may be determined by applying the scalar threshold E to the norm of each output pixel:

$$g(r_t, w, \mathcal{E}) = \text{round}(\sigma(\|w * r_t\|_p - \mathcal{E})), \quad (4)$$

where $\sigma(\cdot)$ indicates a sigmoid function and p represents the order of the norm, and the norm is computed over all channels for each position. However, such a gating strategy may result in the computation of the convolution at each pixel of the residual, which would reintroduce inefficiency. Accordingly, the post-training gating function of Equation 4 may be approximated by considering the norm of each kernel supported in the residual $r_t$, as follows:

$$g(r_t, \mathcal{E}) = \text{round}(\theta(\|r_t\|_p - \mathcal{E})). \quad (5)$$

The gating strategy may be referred to as input-norm gates. In Equation 5 (and below, in Equation 7), the norm of each local support in the residual $r_t$ is computed by applying an absolute value function to the residual $r_t$ tensor, and taking the sum within the $d_i \times k_h \times k_w$ neighborhood, where $d_i$ is the dimension.

A more accurate approximation may be achieved without computing a full convolution, by involving the norm of the weight matrix w. Further, by considering Young's inequality, an upper bound on the norm of the convolution of two vectors f and g may be determined:

$$\|f * g\|_r \le \|f\|_s \cdot \|g\|_q, \quad (6)$$
$$\text{where } \frac{1}{s} + \frac{1}{q} = \frac{1}{r} + 1$$

By following Equation 6, a more precise approximation may be defined based on the norms of both the input residual $r_t$ and the weight matrix w. This gating strategy may be referred to as output-norm gates:

$$g_l(r_t, w, \in) = \text{round}(\sigma(\|w\|_p \cdot \|r_t\|_p - \in)). \quad (7)$$

where the norm $\|w\|_p$ is computed over all four dimensions.

In one implementation, the order p for both input-norm and output-norm gates may be set to 1 (e.g., $l_1$ norm), and the margin E is shared between all layers. More flexible strategies, such as layer-specific E, may also yield better results at the cost of more hyper-parameter adjustment. One advantage of post-training gates is that by employing post-training gates, skip convolution may be readily applied to a pre-trained CNN. In doing so, the efficiency of a pre-trained CNN may be improved without training or fine-tuning.

The post-training gates effectively suppress computation in static regions, but may remain sensitive to significant changes regardless of their content. For instance, because post-training gates are task-agnostic, a change in the background may trigger unnecessary computations that may not impact model performance (e.g., object recognition or tracking). To address this issue, a trainable gating module may learn when to skip residuals. Each layer l in the CNN may be paired with a lightweight gating module $f_l(r_t; \phi_l)$, parametrized by $\phi_l$, composed by a convolution with the same kernel size, stride, and dilation as layer l, but featuring a single output channel. This additional model outputs unnormalized scores, which may be transformed to pixel-wise Bernoulli distributions by applying a sigmoid function. During training, the gating function $g_l(r_t; \phi_l)$ samples binary decisions from such distributions, whereas a 0.5 threshold, for example, may be applied during test:

$$g_l(r_t, \phi_l) \begin{cases} \sim \text{Bern}(\sigma(f_l(r_t; \phi_l))) & \text{if training,} \\ = \text{round}(\sigma(f_l(r_t; \phi_l))) & \text{otherwise} \end{cases} \quad (8)$$

During training, a Gumbel re-parametrization and a straight-through gradient estimator may enable back propagation through the sample procedure. In order to enforce sparsity, an auxiliary objective $S(\Phi)$ may be applied over all gating parameters $\Phi = [\phi_1, \ldots, \phi_L]$:

$$S(\Phi) = \beta \frac{1}{T} \sum_{t=1}^{T} \sum_{l=1}^{L} m_l \cdot \mu(f_l(r_t; \phi_l)), \quad (9)$$

where $\beta$ is a training hyperparameter, T is a temperature, $\mu(\bullet)$ is the mean function, and $m_l$ represents layer specific coefficients, dependent on each layer's multiply-accumulate (MAC) counts. A sparsity objective may be added to the model's loss function (e.g., depending on the downstream task). While the sparsity objective seeks sparsity, the loss function instructs gates to be active in presence of meaningful residuals (and thus skip one or more convolution operations).

When training skip convolution layers with learned gates, the stream processing model may acquire a recurrent architecture, and thus may be trained over fixed-length frame sequences. During testing, the model can either output its predictions recursively to the end of the sequence or instantiate key frames at arbitrary temporal intervals, where a regular convolution is applied and the recurrent state resets.

In some aspects, structured gating of residual feature maps may also be applied. For instance, agreement of sparsity within regions may be suitable for optimized on-device implementations. Thus, an inductive bias in our learned gating modules may be implemented by down-sampling the gating decisions with a structuring element (e.g., max pooling or convolution) to provide block-wise gating.

Figure 7:
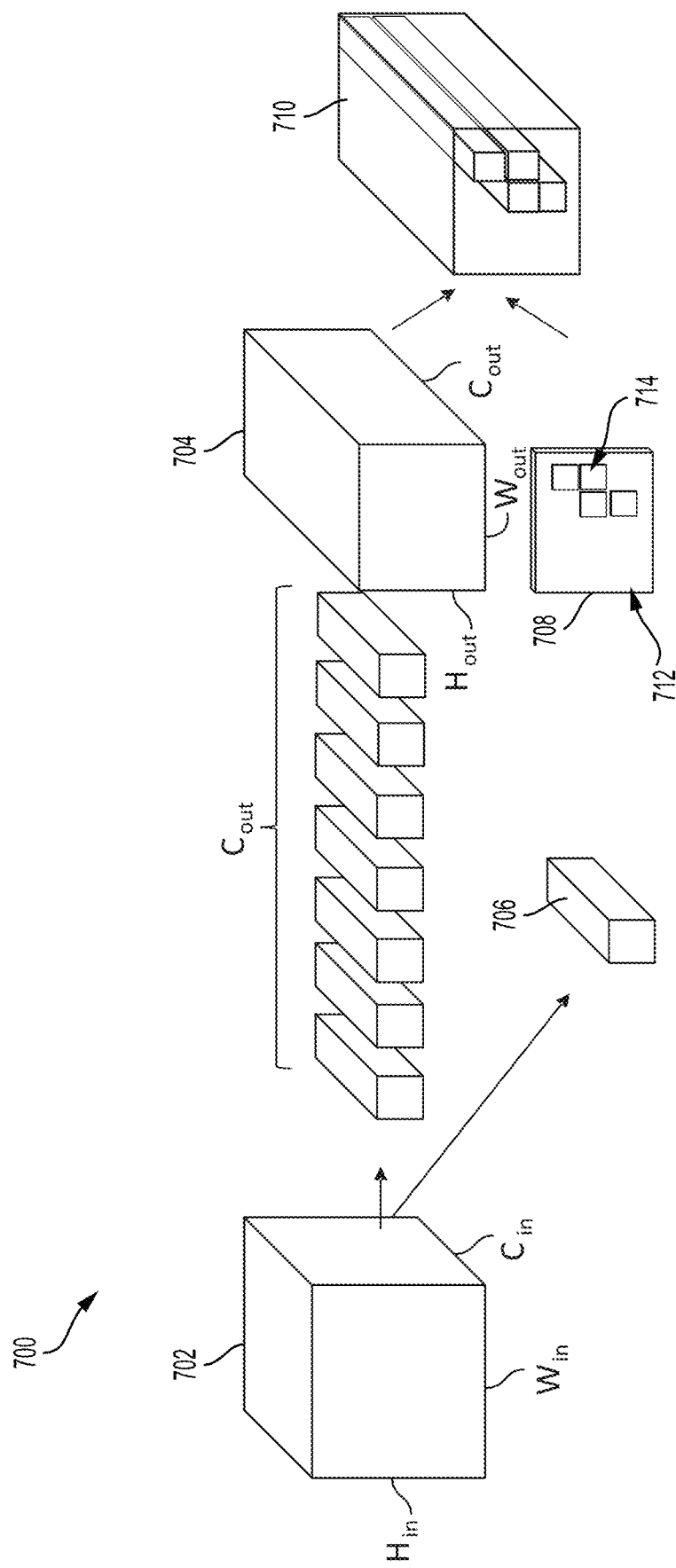
FIG. 7 is a block diagram illustrating an example blockwise implementation of skip convolution with learned gates, in accordance with aspects of the present disclosure.

FIG. 7 is a block diagram illustrating an example block-wise implementation 700 of skip convolution with learned gates, in accordance with aspects of the present disclosure. Referring to FIG. 7, in the block-wise implementation 700, a set of output filters $C_{out}$, are provided to generate convolution outputs 704. An additional convolution filter 706 is added to map an input tensor 702 to generate a gate block 708. The gate block 708 may, for example, be a single output channel binary. The gate block 708 may be applied to indicate which locations of the output 704 are to be masked. Black areas 712 of the gate block 708 may indicate that a mask is to be applied and white areas 714 may indicate an active region. Accordingly, the convolution operation may be performed on the active regions of the output 704 as shown in block 710. Because convolutions for video processing may be performed block-wise (e.g., 8×8 block structures), rather than pixel-by-pixel, the block-wise implementation 700 beneficially predicts the gates on a block-wise basis to leverage hardware parallelization.

Additionally, block structures may be leveraged to reduce memory overhead involved in the gathering and scattering of input and output tensors. Furthermore, hardware platforms may perform convolutions distributed over patches (e.g., 8×8) and thus may not leverage any fine-grained spatial sparsity smaller than such block sizes. Accordingly, the aspects of the present disclosure may be extended to generate structured sparsity by adding a down-sampling and an up-sampling function on the predicted gates. For instance, a max pooling layer with the kernel size and stride of b may be added. The max pooling layer may be followed by a nearest neighbor up-sampling with the same scale factor of b. This may enforce the predicted gates to have a b×b structure.

Figure 8:
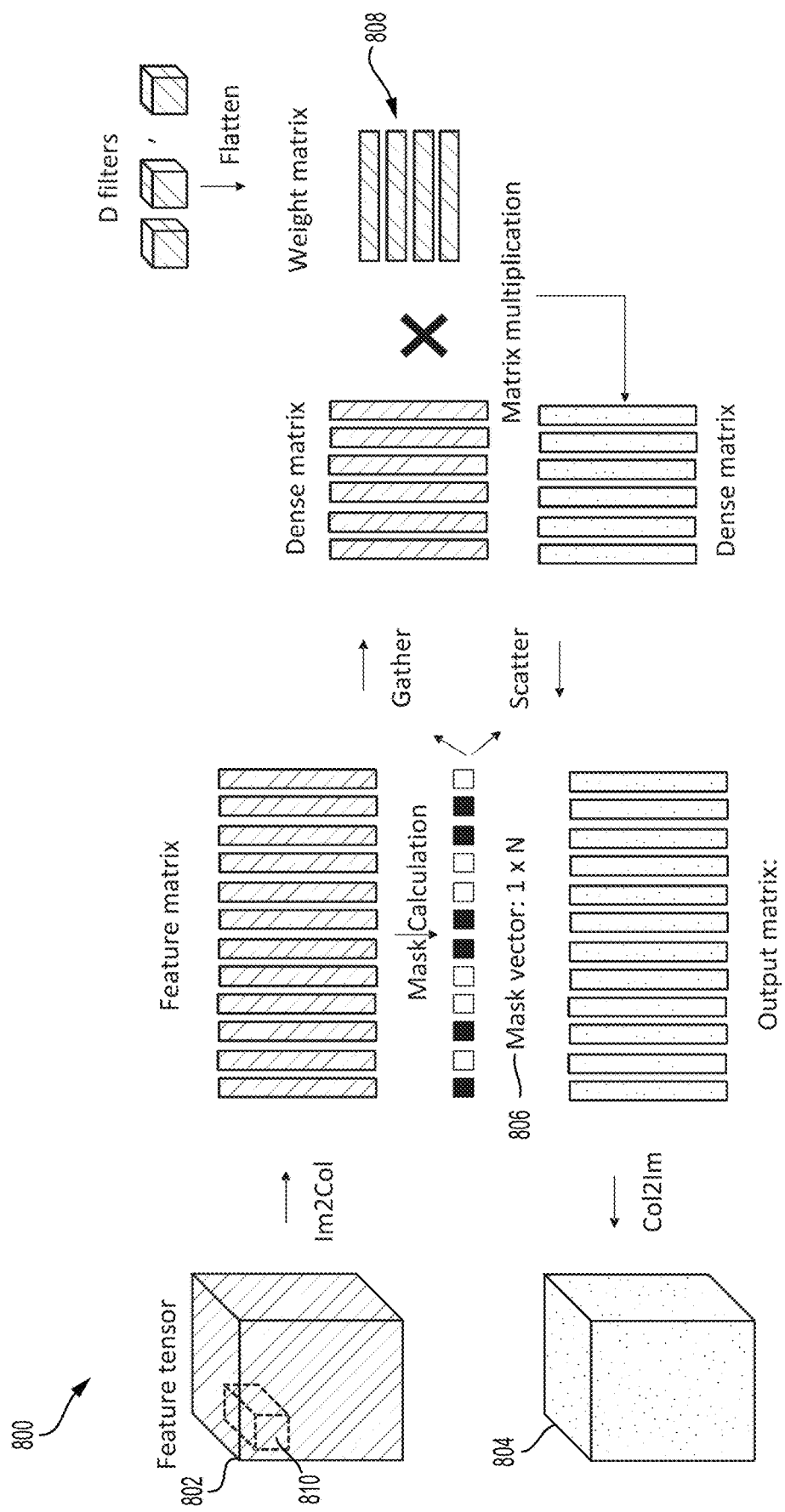
FIG. 8 is a block diagram illustrating an example implementation of skip convolution on a graphics processing unit, in accordance with aspects of the present disclosure.

FIG. 8 is a block diagram illustrating an example implementation of skip convolution on a graphics processing unit 800, in accordance with aspects of the present disclosure. Referring to FIG. 8, aspects of the present disclosure may further increase the image processing speed using the example implementation 800 by conducting the convolutions in a vectorized fashion. As shown, a set of feature tensors 802 are supplied. The feature tensors 802 may be separated into blocks 810. For ease of illustration one block 810 is shown. However, it should be understood that feature tensors 802 includes multiple blocks 810. Each of the blocks 810 may be transformed into a column vector to provide a feature matrix. A mask may be calculated, for example based on the difference between features of the current frame and features of the previous frame to produce a mask vector 806. A mask vector 806 is applied to select locations of the feature matrix for which a convolution operation is to be performed.

A weight matrix 808 may be correspondingly transformed into row vectors. The selected locations of the feature matrix may be gathered or grouped and a matrix multiplication operation may be performed with the corresponding weight matrix 808. The outputs may, in turn, be scattered to the corresponding columns of the output matrix. Accordingly, the output matrix may then be reformed to an output block 804.

Figure 9:
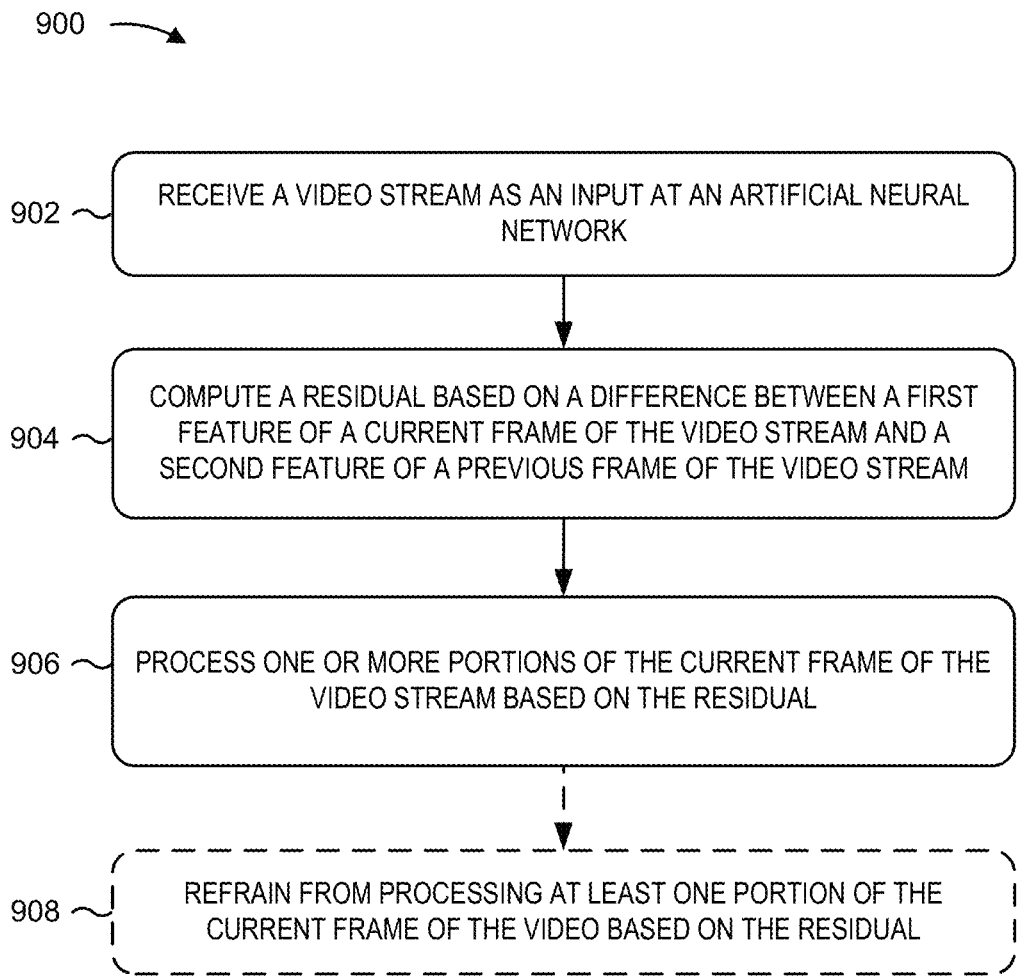
FIG. 9 is a flow diagram illustrating a method for processing a video with an artificial neural network, in accordance with aspects of the present disclosure.

FIG. 9 illustrates a method 900 for video processing via an artificial neural network, in accordance with aspects of the present disclosure. As shown in FIG. 9, at block 902, a video stream is received as an input at the artificial neural network. For instance, as described with reference to FIG. 6, the skip convolution layer 600 receives as inputs a feature $x_t$ corresponding to a current frame and a feature corresponding to a previous frame $x_{t-1}$.

At block 904, a residual is computed based on a difference between a first feature of a current frame of the video stream and a second feature of a previous frame of the video stream. As described with reference to FIG. 6, the difference between the feature $x_t$ of the current frame and the feature $x_{t-1}$ of the previous frame is computed at a difference node 606 to determine a residual $r_t$.

At block 906, one or more portions of the current frame of the video stream are processed based on the residual. For example as described with reference to FIG. 6, the gating block 604 applies a gating function to determine whether to process or mask out each portion of the frame corresponding to the feature. In some examples, where the residual $r_t$ is not negligible (e.g., >0.5), a convolution operation for the corresponding portion of the feature $x_t$ of the current frame may be performed and summed with the previous output $z_{t-1}$ to produce output $z_t$.

Additionally, at block 908, the process optionally refrains from or skips processing one or more portions of the current frame of the video based on the residual. For example, as described with reference to FIG. 6, where the residual $r_t$ for a portion of the feature $x_t$ is negligible (e.g., <0.5), the gating block 604 may output a zero to a convolution node 608 to skip the convolution operation with a weight w. As such, the convolution node 608 outputs a zero to a summing node 610. Thus, the summing node 610 outputs $z_t$ that is equal to the value of the previous output $z_{t-1}$.

Implementation Examples are provided in the following numbered clauses:

1. A method for video processing with an artificial neural network (ANN), comprising:
   receiving a video stream as an input at the artificial neural network;
   computing a residual based on a difference between a first feature of a current frame of the video stream and a second feature of a previous frame of the video stream; and processing one or more portions of the current frame of the video stream based on the residual.
2. The method of clause 1, in which the one or more portions of the current includes only salient regions of the current frame.
3. The method of clause 1 or 2, further comprising applying a convolution kernel to only the salient regions of the current frame.
4. The method of any of clauses 1-3, further comprising determining the salient regions based on whether the residual is greater than a predetermined threshold value.
5. The method of any of clauses 1-4, further comprising refraining from processing at least one portion of the current frame of the video stream based on the residual.
6. The method of any of clauses 1-5, in which a first output corresponding to the at least one portion of the current frame is set equal to a second output corresponding to at least one portion of the previous frame.
7. The method of any of clauses 1-6, further comprising:
   comparing the residual to a predefined threshold value; and applying a mask to the corresponding second features based on the comparing.
8. The method of any of clauses 1-7, further comprising learning a gating function to apply a mask to one or more portions of the current frame based on the residual.
9. The method of any of clauses 1-8, further comprising generating a saliency map based on the gating function.
10. The method of any of clauses 1-9, further comprising adaptively adjusting an amount of computation performed in processing the video stream based on an amount of information observed per frame.
11. An apparatus for video processing with an artificial neural network (ANN), comprising:
a memory; and
at least one processor coupled to the memory, the at least one processor being configured:
   to receive a video stream as an input at the artificial neural network;
   to compute a residual based on a difference between a first feature of a current frame of the video stream and a second feature of a previous frame of the video stream; and
   to process one or more portions of the current frame of the video stream based on the residual.
12. The apparatus of clause 11, in which the one or more portions of the current frame includes only salient regions of the current frame.
13. The apparatus of clause 11 or 12, in which the at least one processor is further configured to apply a convolution kernel to only the salient regions of the current frame.
14. The apparatus of any of clauses 11-13, in which the at least one processor is further configured to determine the salient regions based on whether the residual is greater than a predetermined threshold value.
15. The apparatus of any of clauses 11-14, in which the at least one processor is further configured to refrain from processing at least one portion of the current frame of the video stream based on the residual.
16. The apparatus of any of clauses 11-15, in which a first output corresponding to the at least one portion of the current frame is set equal to a second output corresponding to at least one portion of the previous frame.
17. The apparatus of any of clauses 11-16, in which the at least one processor is further configured:
to compare the residual to a predefined threshold value; and
to apply a mask to the corresponding second features based on the comparing.

18. The apparatus of any of clauses 11-17, in which the at least one processor is further configured to learn a gating function to apply a mask to one or more portions of the current frame based on the residual.
19. The apparatus of any of clauses 11-18, in which the at least one processor is further configured to generate a saliency map based on the gating function.
20. The apparatus of any of clauses 11-19, in which the at least one processor is further configured to adaptively adjust an amount of computation based on an amount of information observed per frame.
21. An apparatus for video processing with an artificial neural network (ANN), comprising:
means for receiving a video stream as an input at the artificial neural network;
means for computing a residual based on a difference between a first feature of a current frame of the video stream and a second feature of a previous frame of the video stream; and
means for processing one or more portions of the current frame of the video stream based on the residual.
22. The apparatus of clause 21, in which the one or more portions of the current frame includes only salient regions of the current frame.
23. The apparatus of clause 21 or 22, further comprising means for applying a convolution kernel to only the salient regions of the current frame.
24. The apparatus of any of clauses 21-23, further comprising means for determining the salient regions based on whether the residual is greater than a predetermined threshold value.
25. The apparatus of any of clauses 21-24, further comprising means for learning a gating function to apply a mask to one or more portions of the current frame based on the residual.
26. A non-transitory computer readable medium having encoded thereon program code for video processing with an artificial neural network (ANN), the program code being executed by a processor and comprising:
program code to receive a video stream as an input at the artificial neural network;
program code to compute a residual based on a difference between a first feature of a current frame of the video stream and a second feature of a previous frame of the video stream; and
program code to process one or more portions of the current frame of the video stream based on the residual.
27. The non-transitory computer readable medium of clause 26, in which the one or more portions of the current frame includes only salient regions of the current frame.
28. The non-transitory computer readable medium of clause 26 or 27, in which the at least one processor is further configured to apply a convolution kernel to only the salient regions of the current frame.
29. The non-transitory computer readable medium of any of clauses 26-28, in which the at least one processor is further configured to determine the salient regions based on whether the residual is greater than a predetermined threshold value.
30. The non-transitory computer readable medium of any of clauses 26-29, in which the at least one processor is further configured to learn a gating function to apply a mask to one or more portions of the current frame based on the residual.

In one aspect, the receiving means, the computing means, processing means and/or the refraining means may be the CPU 102, program memory associated with the CPU 102, the dedicated memory block 118, fully connected layers 362, NPU 428, and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for video processing with an artificial neural network (ANN), comprising:
    receiving a video stream as an input at the artificial neural network;
    computing a residual based on a difference between a first feature of a current frame of the video stream and a second feature of a previous frame of the video stream; and
    determining whether to perform processing, associated with a convolutional layer of the artificial neural network, of one or more portions of the current frame of the video stream based on of the residual.

2. The method of claim 1, in which the one or more portions of the current frame includes only salient regions of the current frame.

3. The method of claim 2, further comprising:
    determining to perform processing, associated with the convolutional layer of the artificial neural network, of one or more portions of the current frame; and
    applying, based on the determination to perform processing, a convolution kernel to only the salient regions of the current frame.

4. The method of claim 2, further comprising determining the one or more salient regions based on whether the residual is greater than a predetermined threshold value.

5. The method of claim 1, further comprising not performing processing of at least one portion of the current frame of the video stream based on the residual.

6. The method of claim 5, in which a first output corresponding to the at least one portion of the current frame is set equal to a second output corresponding to at least one portion of the previous frame.

7. The method of claim 1, further comprising:
    comparing the residual to a predefined threshold value; and
    determining whether to apply a mask to the first feature based on the comparing.

8. The method of claim 1, further comprising learning a gating function for gating the convolutional layer, the gating function configured to apply a mask to one or more portions of the current frame based on the residual.

9. The method of claim 8, further comprising generating a saliency map based on the gating function.

10. The method of claim 1, further comprising adaptively adjusting an amount of computation performed in processing the video stream based on an amount of information observed per frame.

11. An apparatus for video processing with an artificial neural network (ANN), comprising:
    memory; and
    at least one processor coupled to the memory, the at least one processor being configured:
        to receive a video stream as an input at the artificial neural network;
        to compute a residual based on a difference between a first feature of a current frame of the video stream and a second feature of a previous frame of the video stream;
    and
        to determine whether to perform processing, associated with a convolutional layer of the artificial neural network, of one or more portions of the current frame of the video stream based on of the residual.

12. The apparatus of claim 11, in which the one or more portions of the current frame includes only salient regions of the current frame.

13. The apparatus of claim 12, in which the at least one processor is further configured; to determine to perform processing, associated with the convolutional layer of the artificial neural network, of one or more portions of the current frame; and to apply, based on the determination to perform processing, a convolution kernel to only the salient regions of the current frame.

14. The apparatus of claim 12, in which the at least one processor is further configured to determine the one or more salient regions based on whether the residual is greater than a predetermined threshold value.

15. The apparatus of claim 11, in which the at least one processor is further configured to not perform refrain from processing of at least one portion of the current frame of the video stream based on the residual.

16. The apparatus of claim 15, in which a first output corresponding to the at least one portion of the current frame is set equal to a second output corresponding to at least one portion of the previous frame.

17. The apparatus of claim 11, in which the at least one processor is further configured:
    to compare the residual to a predefined threshold value; and
    to determine whether to apply a mask to the first feature based on the comparing.

18. The apparatus of claim 11, in which the at least one processor is further configured to learn a gating function for gating the convolutional layer, the gating function configured to apply a mask to one or more portions of the current frame based on the residual.

19. The apparatus of claim 18, in which the at least one processor is further configured to generate a saliency map based on the gating function.

20. The apparatus of claim 11, in which the at least one processor is further configured to adaptively adjust an amount of computation based on an amount of information observed per frame.

21. An apparatus for video processing with an artificial neural network (ANN), comprising:
- means for receiving a video stream as an input at the artificial neural network;
- means for computing a residual based on a difference between a first feature of a current frame of the video stream and a second feature of a previous frame of the video stream; and
- means for determining whether to perform processing, associated with a convolutional layer of the artificial neural network, of one or more portions of the current frame of the video stream based on of the residual.

22. The apparatus of claim 21, in which the one or more portions of the current frame includes only salient regions of the current frame.

23. The apparatus of claim 22, further comprising:
- means for determining to perform processing, associated with the convolutional layer of the artificial neural network, of one or more portions of the current frame; and
- means for applying, based on the determination to perform processing, a convolution kernel to only the salient regions of the current frame.

24. The apparatus of claim 22, further comprising means for determining the one or more salient regions based on whether the residual is greater than a predetermined threshold value.

25. The apparatus of claim 21, further comprising means for learning a gating function for gating the convolutional layer, the gating function configured to apply a mask to one or more portions of the current frame based on the residual.

26. A non-transitory computer readable medium having encoded thereon program code for video processing with an artificial neural network (ANN), the program code being executed by a processor and comprising:
- program code to receive a video stream as an input at the artificial neural network;
- program code to compute a residual based on a difference between a first feature of a current frame of the video stream and a second feature of a previous frame of the video stream; and
- program code to determine whether to perform processing, associated with a convolutional layer of the artificial neural network, of one or more portions of the current frame of the video stream based on of the residual.

27. The non-transitory computer readable medium of claim 26, in which the one or more portions of the current frame includes only salient regions of the current frame.

28. The non-transitory computer readable medium of claim 27, in which the at least one processor is further configured to determine to perform processing, associated with the convolutional layer of the artificial neural network, of one or more portions of the current frame; and
- to apply, based on the determination to perform processing, a convolution kernel to only the salient regions of the current frame.

29. The non-transitory computer readable medium of claim 28, in which the at least one processor is further configured to determine the one or more salient regions based on whether the residual is greater than a predetermined threshold value.

30. The non-transitory computer readable medium of claim 26, in which the at least one processor is further configured to learn a gating function for gating the convolutional layer, the gating function configured to apply a mask to one or more portions of the current frame based on the residual.

* * * * *